(No Model.)

C. E. LONGDEN.
SYRINGE COUPLING.

No. 506,882. Patented Oct. 17, 1893.

Witnesses.
J. H. Shumway.
Chas. E. Peck.

Charles E. Longden
Inventor
By Atty.
Earle Seymour

UNITED STATES PATENT OFFICE.

CHARLES E. LONGDEN, OF NEW HAVEN, CONNECTICUT, ASSIGNOR TO THE SEAMLESS RUBBER COMPANY, OF SAME PLACE.

SYRINGE-COUPLING.

SPECIFICATION forming part of Letters Patent No. 506,882, dated October 17, 1893.

Application filed April 14, 1893. Serial No. 470,318. (No model.)

*To all whom it may concern:*

Be it known that I, CHARLES E. LONGDEN, of New Haven, in the county of New Haven and State of Connecticut, have invented a new Improvement in Syringe-Couplings; and I do hereby declare the following, when taken in connection with accompanying drawings and the letters of reference marked thereon, to be a full, clear, and exact description of the same, and which said drawings constitute part of this specification, and represent, in—

Figure 1:
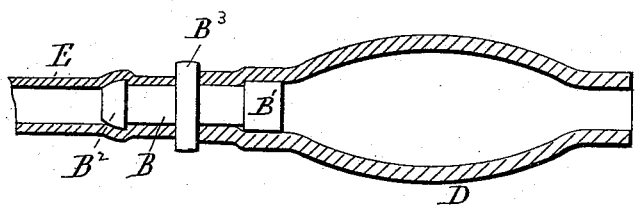
Figure 2:
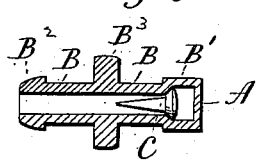
Figure 3:
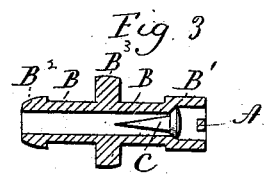
Figure 5:
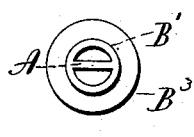
Figure 4:
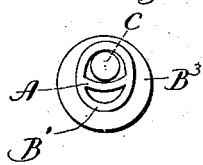

Figure 1, a view in central longitudinal section of an elastic syringe-bulb provided with a coupling constructed in accordance with my invention; Fig. 2, a detached view of the coupling in horizontal section; Fig. 3, a similar view taken on a line at a right angle to the plane of Fig. 2; Fig. 4, a view in end elevation showing the valve being introduced into the coupling; Fig. 5, a view of the completed coupling in end elevation.

My invention relates to an improvement in the couplings employed to connect elastic-bulb syringes with tubes, the object being to produce, at a low cost for manufacture, a simple and effective device, which will not corrode in use.

With these ends in view, my invention consists in a coupling having certain details of construction as will be hereinafter described and pointed out in the claim.

Before proceeding to the description of my improved device, it may be well to state that heretofore the valves used in such couplings have been secured in place by means of a metal pin or rivet, introduced into the coupling after the valve has been inserted thereinto. The objection to the construction described is, that the metal pin is likely to corrode in use, and may work loose.

In carrying out my invention, I replace the pin heretofore used by a retaining-bar A, which is made integral with the coupling B, when the same is molded. The process consists in molding the coupling with the said retaining-bar, and then vulcanizing it sufficiently while in the mold, to cause it to retain its shape, but without depriving it of its elasticity. It is then removed from the mold, and the valve C, pushed into its place by stretching the coupling and bar, as shown in Fig. 4 of the drawings. Just as soon as the valve has found its place in the coupling, the same recovers, and is then vulcanized until it becomes hard, having, when done, the form shown in Fig. 5 of the drawings. By following this method, I am enabled to mold the retaining-bar for holding the valve in place, integral with the coupling. This bar will not corrode, and will last as long as any portion of the coupling, whereas the pin heretofore used would corrode, and might get displaced, as above referred to.

I do not limit myself to employing my invention in connection with couplings of any particular form. I might, for instance, apply it to the coupling of the particular form shown in United States Patent No. 470,430, granted to me February 8, 1892. The coupling shown in the accompanying drawings, has a head B', at one end for insertion into the syringe D, a head B² for the attachment of the tube E, and a hub B³, located between the said heads B' and B², for the ends of the tube and syringe to abut against. Nor am I limited to the use of my invention in making elastic-bulb syringe couplings, for it is obviously applicable to the manufacture of small valves having hard rubber bodies. I would therefore have it understood that I do not limit myself to the particular construction herein shown and described, but hold myself at liberty to make such changes and alterations as fairly fall within the spirit and scope of my invention.

Having fully described my invention, what I claim as new, and desire to secure by Letters Patent, is—

An elastic-bulb syringe-coupling made of hard rubber and having a retaining-bar formed integral with it, and a valve located within the coupling and retained in place by the said bar, and introduced into the coupling by temporarily stretching the same and displacing the bar while the coupling is soft and before the vulcanization of the rubber has been completed, substantially as described.

In testimony whereof I have signed this specification in the presence of two subscribing witnesses.

CHARLES E. LONGDEN.

Witnesses:
FRED C. EARLE,
J. H. SHUMWAY.